C. H. SHARP.
PHOTOMETER.
APPLICATION FILED AUG. 26, 1916.

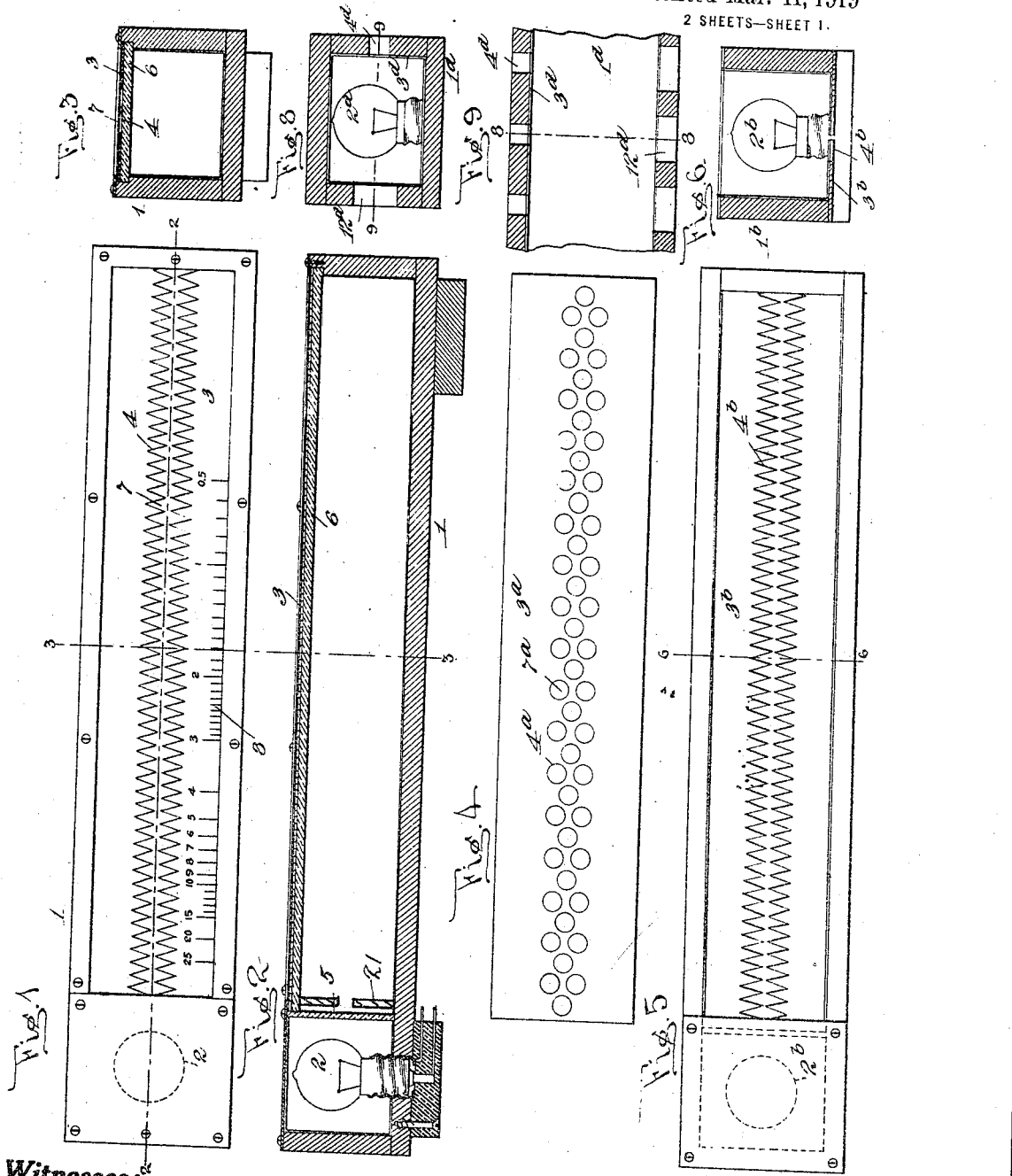

1,297,260.

Patented Mar. 11, 1919.
2 SHEETS—SHEET 2.

Witnesses:

Inventor
Clayton H. Sharp
By Dyer Taylor
Attorneys.

UNITED STATES PATENT OFFICE.

CLAYTON H. SHARP, OF WHITE PLAINS, NEW YORK, ASSIGNOR TO GENERAL ELECTRIC COMPANY, A CORPORATION OF NEW YORK.

PHOTOMETER.

1,297,260.     Specification of Letters Patent.     Patented Mar. 11, 1919.

Application filed August 26, 1916. Serial No. 116,965.

*To all whom it may concern:*

Be it known that I, CLAYTON H. SHARP, a citizen of the United States, residing in White Plains, county of Westchester, and State of New York, have invented a certain new and useful Photometer, of which the following is a specification.

This invention relates to improvements in photometers for the measurement of illumination, and has for its principal object the simplification of devices whereby it may be made portable, small and cheap. A further object is to produce a photometer having no movable parts. These and further objects will more fully appear in the following specification and accompanying drawings considered together or separately.

Figure 1 is a plan view of a photometer embodying the invention.

Fig. 2 is a sectional view thereof on the line 2—2 of Fig. 1.

Fig. 3 is a sectional view thereof on the line 3—3 of Figs. 1 and 2.

Fig. 4 is a plan view of a modified form of photometric element.

Fig. 5 is a plan view of a modified form of photometer embodying the invention.

Fig. 6 is a sectional view on the line 6—6 of Fig. 5.

Fig. 8 is a similar view of still another modification, said section being taken on the line 8—8 of Fig. 9.

Fig. 9 is a sectional view taken on line 9—9 of Fig. 8.

In all of the views like parts are designated by the same reference characters.

Figure 10:
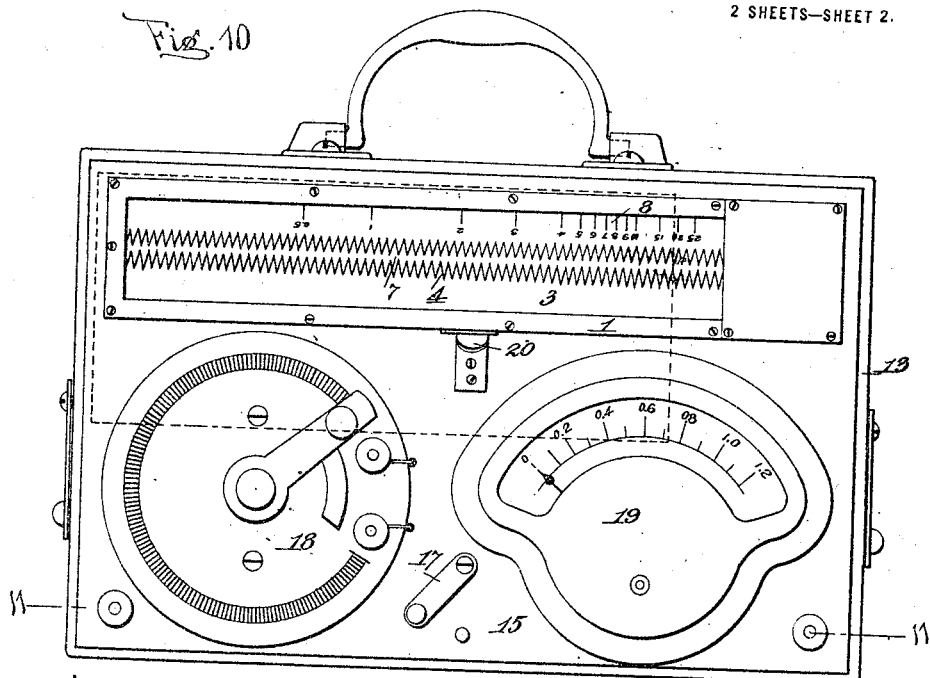
Fig. 10 is a plan view of a complete form of portable photometer embodying the invention.

Figs. 1, 2 and 3 represent a simple embodiment of the invention. The device as illustrated is inclosed in a casing 1. This casing is preferably of rectangular shape, and its length considerably exceeds its width or depth. Within this casing is a suitable source of illumination. This source of illumination may be an incandescent electric lamp adjusted so as to give a suitable candle power. Instead of an electric lamp, any other form of lamp may be employed, provided it gives a suitable candle power.

Associated with the casing 1, in the embodiment chosen for illustration, located on the upper surface thereof, is a photometric element 3. This element is substantially opaque, but with a white reflecting surface, so as to reflect the illumination to the eye of the observer. Within this element is a comparison aperture 4. This comparison aperture is shown as extending throughout the length of the photometric element. It is considerably longer than it is wide, and is also in alinement with the source of illumination. The edge of the aperture is shown as serrated or saw toothed. Adjacent to the source of illumination is a diffusing partition 5, which may be made of semi-transparent glass. This partition is not necessary but it is desirable.

The photometric element, in this embodiment of this invention, is shown as made of a transparent support 6, preferably a sheet of transparent glass. The photometric element is completed by means of a sheet of cardboard or similar material with a diffusely reflecting surface applied to and supported by the transparent support 6, and having the comparison aperture cut within. The color of the cardboard and consequently the color of the reflecting surface will be chosen in connection with the light which is to be measured. For measuring illumination by tungsten lamps, I prefer to use white. For measuring daylight I prefer to use a cardboard of yellowish tinge so as to produce a color match with the light from the lamp passing through the comparison aperture. This comparison aperture is inclosed by a diffusing surface 7, which is preferably made of unglazed paper, which is quite thin and of a diffusing nature. This unglazed paper preferably extends over the whole surface of the cardboard, so that all of the surface of the photometric element has the same texture.

Associated with the photometric element is a scale 8. The interior of the casing is preferably provided with a coating, the sides and bottom being coated white, while the end opposite the source of illumination is coated black.

In operation the device is placed at the point where the illumination is to be measured, in such a position that the photometric element may be observed. When this is done the interior of the casing will be illuminated by the lamp 2, and the comparison aperture will be illuminated from the inside of the casing, while the outside of the photometric element will be illuminated by the illumination, which is to be measured. The operator may then observe the illumination on the photometric element, which is constant throughout its length, and the illumination through the comparison aperture, which varies in respect to its distance from the source of illumination 2. At the point where these two separate points of illumination are of the same value, the amount of illumination in foot candles, or other suitable units will appear upon the scale 8, which it is to be understood has been suitably calibrated for this purpose.

In the embodiment chosen for illustration, the light from the lamp will illuminate the diffusing surface 7 to a degree, which will vary from the end nearest the lamp to the other end of the casing. The illumination, therefore, will gradually vary while the other portion of the photometric element will be uniformly illuminated from the source of illumination outside of the casing, which is to be measured.

By making the comparison aperture with an irregular or serrated edge, the observer will have no difficulty in very accurately determining where the point of equal illumination occurs. On the end of the aperture adjacent to the lamp 2 the aperture will appear brighter than the outer surface of the photometric element, while the other end of the aperture will be darker. At some point between these the outside illumination reflected to the eye from the photometric element and the inside illumination passing through the comparison aperture are equal in value, and at this point it is difficult for the eye to distinguish the edges of the aperture. This is the point which the eye must seek in using the instrument, and this is the point which will indicate the amount of illumination upon the scale 8.

In order to adapt the instrument to actual measurement of illumination, it is necessary to calibrate it. This may conveniently be done in the following manner:—A standard lamp which gives an exactly known candle power is so located as to produce a known illumination on the surface of the photometric element of the instrument. With a given current or a given voltage held constant on the lamp 2 within the casing the eye of the observer seeks the point of balance as already described. At this point he puts a mark which is numbered to agree with the known value of the exterior illumination. The exterior illumination is then changed to another known value and the process is repeated. By taking a sufficient number of points an entire scale may be established.

Fig. 4 shows a modification of the invention, in which the comparison aperture $4^a$ is in the form of a plurality of circular openings so arranged as to produce an irregular edge. Each circular opening constitutes a small comparison aperture in the photometric element. These apertures are so distributed along the photometric element that a small portion of each aperture corresponds to every distance along the photometric element, therefore, they produce an effect similar to that illustrated in Fig. 1.

Figs. 5 and 6 illustrate a modification of the invention in which the photometric element is located at the bottom of the casing, the top of the casing being open. The comparison aperture is entirely open and is not closed by a diffusing surface as that illustrated in Figs. 1 and 2.

In using this instrument it is placed above the surface, the illumination or brightness of which is to be measured, and the observer looks through the casing and also through the comparison aperture. The inner surface of the photometric element being illuminated from the lamp $2^b$ to a degree varying with the distance from such lamp, the observer may determine at what point the illumination balances and this is the point which will be indicated upon the scale as showing the amount of illumination or brightness which is measured.

Figure 7:
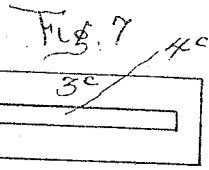
Fig. 7 is a plan view of another modified form of photometric element.

Fig. 7 is a modification of the invention in which the photometric element $3^c$ is composed of a sheet of cardboard having a rectangular slit or opening $4^c$ which constitutes the comparison aperture. This aperture is adapted to extend longitudinally in relation to the casing.

Figs. 8 and 9 illustrate an embodiment of the invention, in which the observation is taken through the side of the casing. In this embodiment the comparison aperture $4^d$ is made in the form of a series of spaced openings. On the opposite side of the casing are equally spaced observation apertures $12^d$. The inside of the casing is provided with the white diffusing surface, hereinbefore described. In the use of this device, the casing is held at one side of the surface, the illumination or brightness of which is to be measured, and the observer successively looks through the apertures $12^d$, seeing the surface to be illuminated through the apertures $4^d$ and also the illumination from the lamp on the inner wall of the casing surrounding such apertures. One of these apertures will show substantially the same amount of illumination in the aperture as on the surrounding wall, and this particular aperture will be associated with the scale (not shown) indicating the amount of illumination or brightness which is measured.

Figure 11:
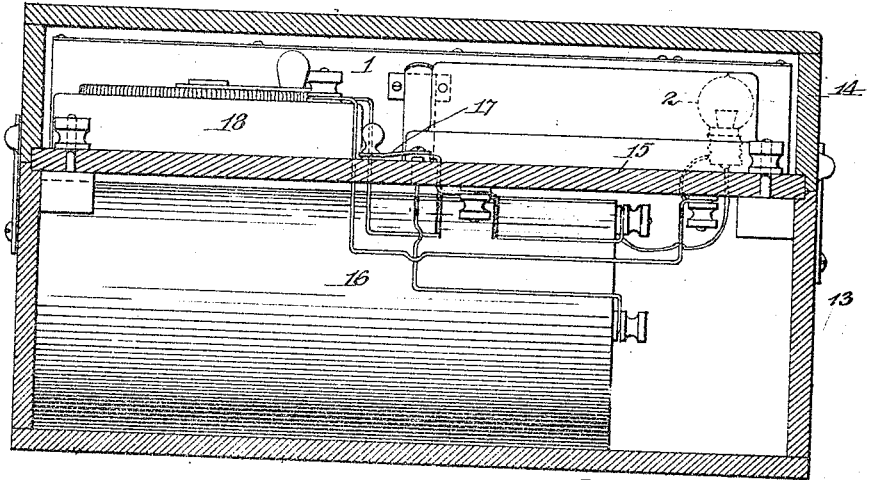
Fig. 11 is a sectional view thereof taken on the line 11—11 of Fig. 10.
Figure 12:
Fig. 12 is a diagrammatic view of electric connections suitable for the structure illustrated in Figs. 10 and 11.

Figs. 10 and 11 illustrate a practical embodiment of my invention adapted to produce a small portable photometer. The device is located within a carrying case 13 shown as having a cover 14 and a suitable carrying handle. The case is provided with a partition 15 below which is a battery 16; on the partition is a suitable switch 17, a rheostat 18 and a voltmeter 19. The casing 1 is suitably attached to the partition by means of a clasp 20. Suitable wire connections are made, as shown in Fig. 12, from the battery to the switch, the lamp 2, voltmeter 19 and rheostat 18. By means of the rheostat a current of given voltage registered on the voltmeter may be caused to flow through the lamp. The candle power of the lamp will depend upon the voltage and the operator may adjust the position of the moving element of the rheostat so that the voltage and candle power of the lamp are constant. The device may be placed anywhere the illumination of which it is desired to measure, and the amount of such illumination will be indicated upon the scale in the manner hereinbefore described.

In some instances it may be desirable to measure more feeble illumination or brightness. In Fig. 2 is shown an attachment permitting this to be done. In the embodiment chosen for illustration this attachment comprises a diaphragm 21 having an aperture. This aperture will permit a reduced amount of illumination from the lamp 2, which enters the casing 1. If the aperture is properly proportioned, the same scale 8 may be employed, dividing or multiplying it by a suitable constant.

The character and material of which the photometric element is made will vary in accordance with the situation. The color of the photometric element may be changed in accordance with the color of light and intensity of the light, which is to be measured. For example, in measuring daylight, a paper with a yellowish tint may be employed covering the photometric surface so that two results will be accomplished—first, the brightness of the surface will be reduced to such a value that it will be comparable with the brightness of the comparison aperture and second, the color of the reflected light from the photometric surface will be made to correspond to the color of the light transmitted through the comparison aperture, the latter condition being one desirable for accuracy in observations.

The extent of the range of use of the instrument may be increased by changing the character of the reflecting surface of the photometric element—for example, a gray paper having a low coefficient of reflection may be used to measure the illuminations of high value.

In accordance with the provisions of the patent statutes I have described the principle of my invention, together with the apparatus which I now consider to represent the best embodiment thereof, but I desire to have it understood that the apparatus shown is merely illustrative, and that the invention may be carried out in other ways.

Having now described my invention what I now claim as new and desire to secure by Letters Patent, is:

1. A photometer comprising a casing having an elongated comparison aperture, a comparison lamp in said casing adjacent one end of said aperture, and a photometric element mounted in said casing to be exposed through said aperture and to be illuminated from one end by said lamp and colored to cause the light reflected from said element to have the same color value as the light transmitted through the comparison aperture.

2. A portable photometer comprising a box, an elongated inclosed casing set on top of the box and having an elongated comparison aperture in the top of said casing, a comparison lamp mounted at one end of said casing, a battery in said box, controlling and measuring instruments mounted on the top of said box adjacent said casing and connected to said battery to control and measure the current to said comparison lamp, and an elongated photometric element mounted in said casing to be illuminated from one end by said lamp and extending lengthwise of said casing to be exposed to view through said aperture.

This specification signed and witnessed this twenty-fifth day of August, 1916.

CLAYTON H. SHARP.

Witnesses:
LEONARD H. DYER,
W. E. STRONG.